United States Patent
Lai et al.

(10) Patent No.: US 8,558,818 B1
(45) Date of Patent: Oct. 15, 2013

(54) OPTICAL TOUCH SYSTEM WITH DISPLAY SCREEN

(71) Applicant: Hon Hai Precision Industry Co., Ltd., New Taipei (TW)

(72) Inventors: Cheng-Yi Lai, New Taipei (TW); Chun-Cheng Ko, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/938,283

(22) Filed: Jul. 10, 2013

Related U.S. Application Data

(62) Division of application No. 12/728,252, filed on Mar. 21, 2010.

(30) Foreign Application Priority Data

Apr. 21, 2009 (CN) .......................... 2009 1 03017408

(51) Int. Cl.
  *G06F 3/041* (2006.01)
(52) U.S. Cl.
  USPC ........................................ 345/175; 178/18.09
(58) Field of Classification Search
  USPC ........................................ 345/175; 178/18.09
  See application file for complete search history.

(56) References Cited

U.S. PATENT DOCUMENTS

| | | | |
|---|---|---|---|
| 2004/0104894 A1* | 6/2004 | Tsukada et al. | 345/168 |
| 2004/0257347 A1* | 12/2004 | Noji | 345/179 |
| 2006/0101349 A1* | 5/2006 | Lieberman et al. | 715/773 |
| 2008/0068352 A1* | 3/2008 | Worthington et al. | 345/175 |
| 2010/0190548 A1* | 7/2010 | Motyl et al. | 463/25 |

* cited by examiner

*Primary Examiner* — Jonathan Boyd
(74) *Attorney, Agent, or Firm* — Altis & Wispro Law Group, Inc.

(57) ABSTRACT

An optical touch system includes a display screen having a contact surface, two infrared light sources emitting infrared light to cover the contact surface, two linear infrared sensors each having a sensing surface with a lengthwise direction thereof parallel to the contact surface, a processor, and a controller. Each linear infrared sensor captures an image of the contact surface with an infrared portion representing a touch area of a contact object, the image has an aspect ratio greater than that of the contact surface. The processor determines the touch location of the contact object based on the aspect ratios of the image and the contact surface, the location of the infrared portion on the image, the area of the infrared portion and the area of the touch portion of the contact object. The controller executes an instruction according to the determined location of the contact object.

11 Claims, 5 Drawing Sheets

OPTICAL TOUCH SYSTEM WITH DISPLAY SCREEN

CROSS-REFERENCE TO RELATED APPLICATION

This application is a divisional application of a commonly-assigned application entitled "OPTICAL TOUCH SYSTEM WITH DISPLAY SCREEN," filed on Mar. 21, 2010 with application Ser. No. 12/728,252. The disclosure of the above-identified application is incorporated herein by reference.

BACKGROUND

1. Technical Field

The present disclosure relates to optical touch technologies and, particularly, to an optical touch system equipped with a display screen.

2. Description of Related Art

Touch screens, such as capacitance touch screens, are widely used in electronic devices to replace keyboards and mice. Capacitance touch screens detect surface locations where contact thereon generates a change in capacitance, with instructions corresponding to the detected locations relayed to the electronic device and, in turn, the instructions are carried out. While input to the electronic devices is simplified, capacitance of the touch screen is easily influenced by environmental factors such as temperature, and humidity. As a result, drifting can occur during detection, affecting accuracy.

Therefore, what is needed is an optical touch system with a touch screen which can overcome the limitations described.

DETAILED DESCRIPTION

Figure 1:
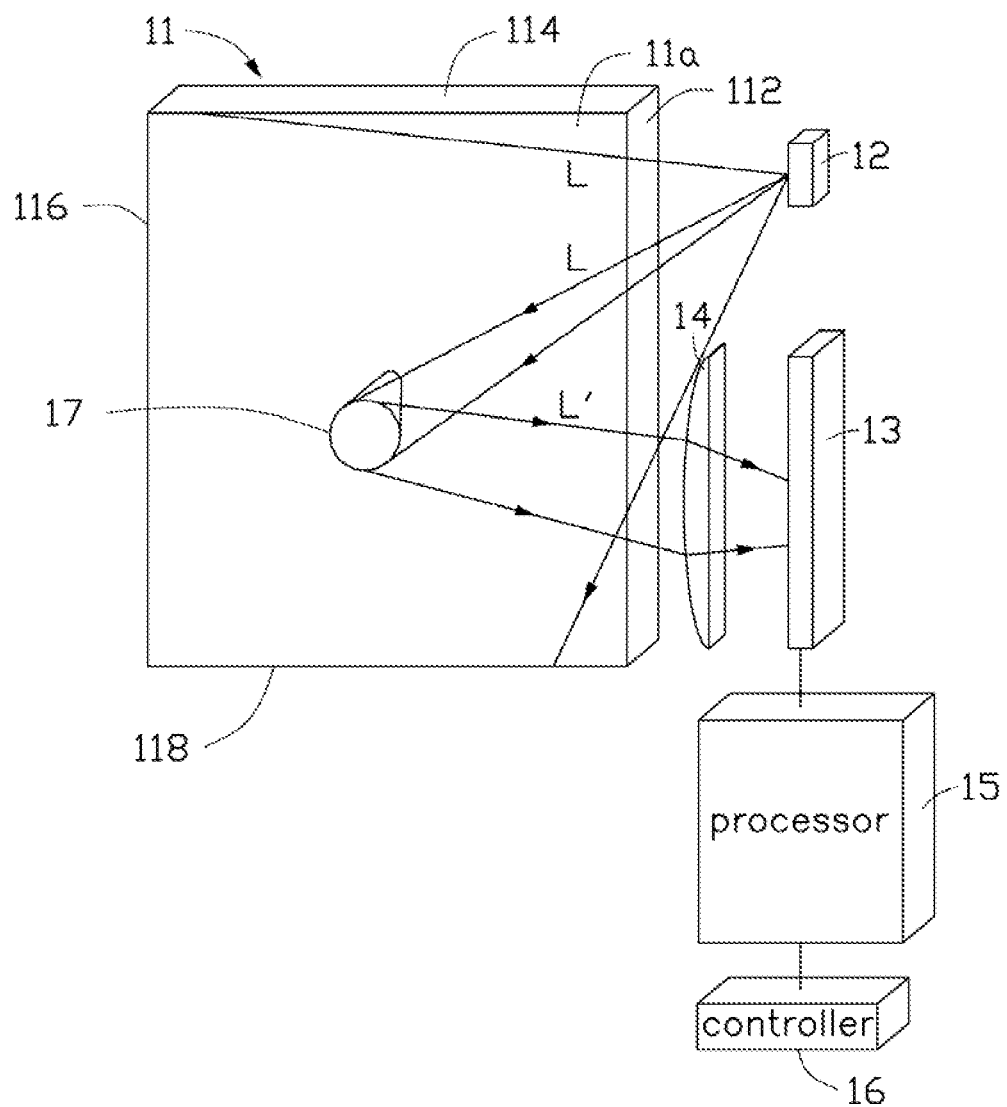
FIG. 1 is an isometric, schematic view of an optical touch system including a linear infrared sensor, according to a first exemplary embodiment.

Referring to FIG. 1, an optical touch system 10, according to a first exemplary embodiment, includes a display screen 11, an infrared light source 12, a linear infrared sensor 13, a lens 14, a processor 15, and a controller 16.

The display screen 11 may be used in an electronic device (not shown), such as a computer, an automatic teller machine (ATM), or a personal assistant device (PAD). The display screen 11 is configured for providing contact detection for a contact object 17, such as a stylus or a finger. In this embodiment, the display screen 11 is rectangular and includes a first sidewall 112, a second sidewall 114, a third sidewall 116, and a fourth sidewall 118. The first sidewall 112, the second sidewall 114, the third sidewall 116, and the fourth sidewall 118 connect to each other end to end in that order. The infrared light source 12, the linear infrared sensor 13, and the lens 14 are positioned adjacent to the first sidewall 112 outside the display screen 11.

The infrared light source 12 is an infrared light emitting diode (LED) and configured for emitting infrared light to cover a contact surface 11a of the display screen 11. When the contact object 17 contacts the contact surface 11a, the infrared light emitted from the infrared light source 12 is reflected by the contact object 17 toward the lens 14.

The lens 14 is configured for directing the reflected infrared light to the linear infrared sensor 13.

The linear infrared sensor 13 may be a charge coupled device (CCD) or a complementary metal oxide semiconductor (CMOS). Linear arrays of pixels, such as CCD pixels or CMOS pixels, are arranged on a sensing surface of the linear infrared sensor 13. In this embodiment, the linear infrared sensor 13 includes linear arrays of CCD pixels. The linear infrared sensor 13 is configured for capturing an image of the contact surface 11a with an infrared portion representing a touch area of the contact object 17. The image has an aspect ratio greater than that of the contact surface 11a.

The processor 15 is electrically connected to the linear infrared sensor 13. The processor 15 is configured for receiving the image, calculating area of the infrared portion in the image, and determining the location of the infrared portion on the image.

Figure 2:
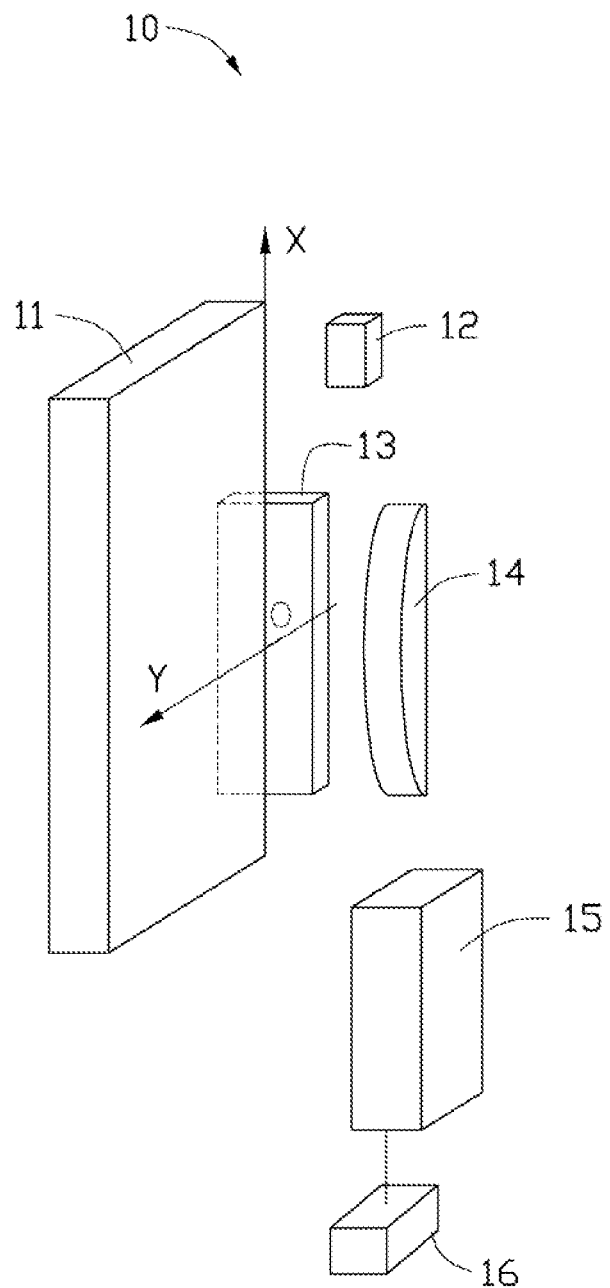
FIG. 2 is similar to FIG. 1, but viewed from another angle.
Figure 3:
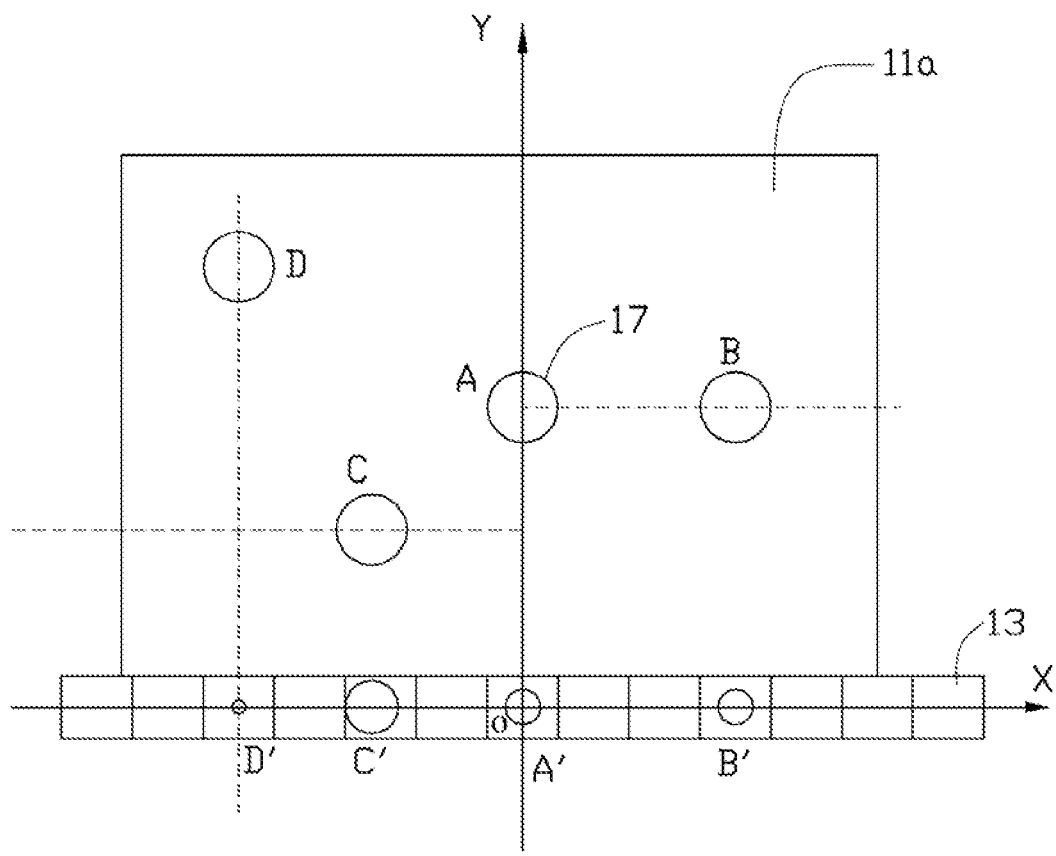
FIG. 3 is a schematic view of the optical touch system of FIG. 1, showing the linear infrared sensor in a coordinate system.

In particular, referring to FIGS. 2 and 3, a Cartesian coordinate system is provided. An origin O is defined on the linear infrared sensor 13. An X coordinate axis passes through the origin O parallel to the linear arrays of CCD pixels of the linear infrared sensor 13. A Y coordinate axis is defined perpendicular to the X coordinate axis. The Y coordinate axis is on the contact surface 11a of the display screen 11 and extends from the origin O.

For example, when the contact object 17 contacts the contact surface 11a at location A, the linear infrared sensor 13 captures an image. The image has an infrared portion A' where the infrared light reflected by the contact object 17 is captured. The infrared portion A' is located at the origin O in this example. If the contact object 17 contacts the contact surface 11a at another location, such as location B, location C, or location D, the linear infrared sensor 13 captures another image accordingly. Correspondingly, the other image may have an infrared portion B', an infrared portion C', or an infrared portion D'. The infrared portion A', the infrared portion B', the infrared portion C', and the infrared portion D' are substantially round. The area of the infrared portion satisfies the formula $S_{A'} = \pi R^2$, where $S_{A'}$ is the area of the infrared portion, and R is the radius of the infrared portion.

The processor 15 calculates the areas of the infrared portion and determines an X coordinate value and a Y coordinate value of a center of the infrared portion on the linear infrared sensor 13. It is to be noted that the Y coordinate value of the contact object 17 on the contact surface 11a is inversely proportional to the area of the captured infrared portion, that is, increased distance of the contact object 17 on the contact surface 11a from the first sidewall 112 corresponds to decreased area of the infrared portion. For example, if the area of the infrared portion A' is approximately equal to that of the infrared portion B', the area of the infrared portion A' is less than that of the infrared portion C', and the area of the infrared portion A' exceeds that of the infrared portion D', as illustrated in FIG. 3.

The processor 15 is further configured for determining the touch location of the contact object 17 based on the aspect ratios of the image and the contact surface 11a, the location of the infrared portion on the image, the area of the infrared portion and the area of the touch portion of the contact object 17 on the contact surface 11a. In particular, the touch location of the contact object 17 $(X_A, Y_A)$ satisfies the formulas:

$X_A=X_{A'}+a\, X_{A'}, Y_A=Y_{A'}+b\, S/S_{A'}$, where $(X_{A'}, Y_{A'})$ is the location of the infrared portion on the image, a is the aspect ratio of the image, b is the aspect ratio of the contact surface 11a, S is the area of the touch portion of the contact object 17, and $S_{A'}$ is the area of the infrared portion. In this embodiment, a, b, and S are constant, and $(X_{A'}, Y_{A'})$ and $S_{A'}$ can be calculated by the processor 15.

The controller 16 is electrically connected to the processor 15 and the display screen 11. The controller 16 is configured for executing an instruction according to the determined location of the contact object 17 on the contact surface 11a and directing the display screen 11 to display a result of the instruction. Thus preventing drift occurring during detection and making detection more consistent and accurate. It is to be understood that the instruction and the result can be different when different applications are launched.

Figure 4:
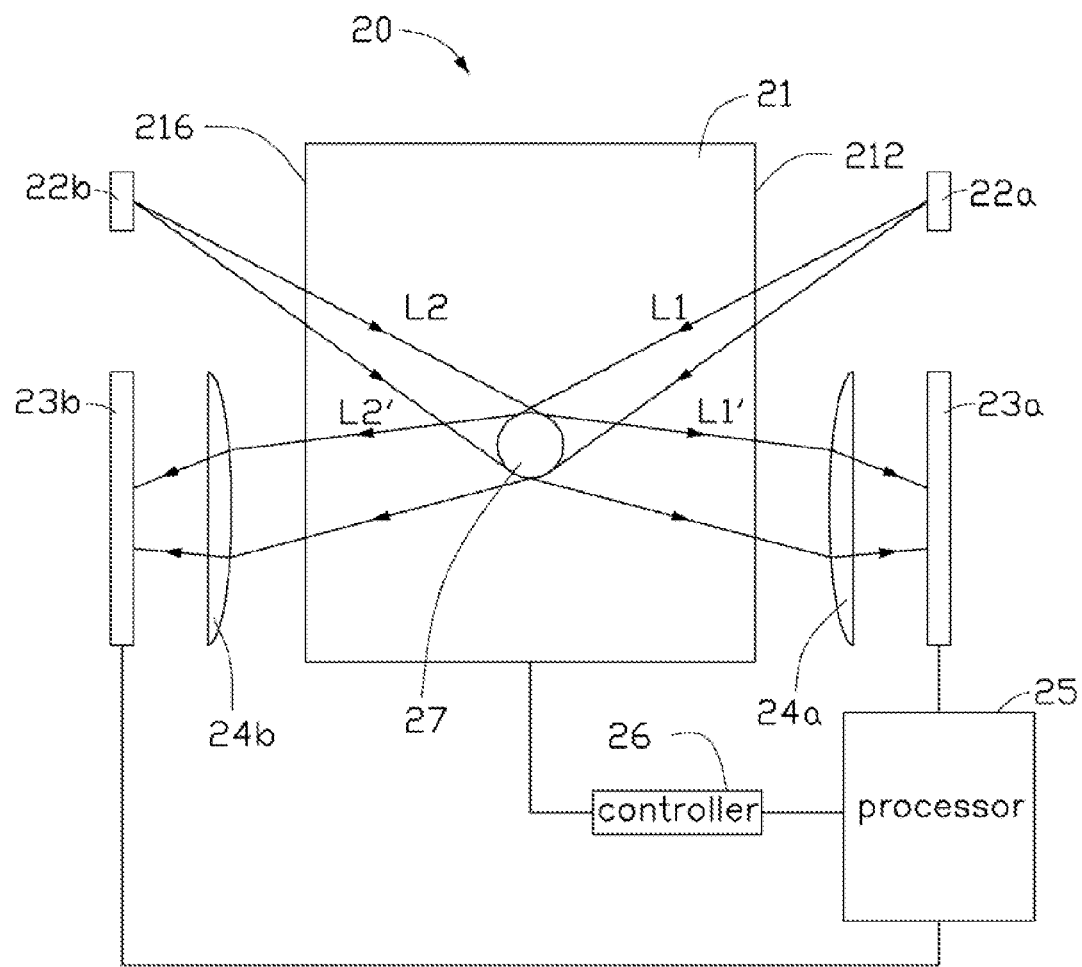
FIG. 4 is a schematic view of an optical touch system according to a second exemplary embodiment.

Referring to FIG. 4, an optical touch system 20, according to a second exemplary embodiment is shown. The optical touch system 20 includes a display screen 21, two infrared light sources 22a, 22b, two linear infrared sensors 23a, 23b, two lenses 24a, 24b, a processor 25, and a controller 26. The infrared light source 22a, the linear infrared sensor 23a, and the lens 24a are positioned adjacent to the first sidewall 212 outside the display screen 21. The infrared light source 22b, the linear infrared sensor 23b, and the lens 24b are positioned adjacent to the third sidewall 216 outside the display screen 21. The processor 25 is electrically connected to the linear infrared sensors 23a, 23b. The controller 26 is electrically connected to the processor 25 and the display screen 21.

When in use, the linear infrared sensor 23a captures an image of the contact object 27 contacting the display screen 21 adjacent to the first sidewall 212, the linear infrared sensor 23b captures an image of the contact object 27 contacting the display screen 21 adjacent to the third sidewall 216, and the processor 25 determines the corresponding location of the contact object 27 on the display screen 21. As a result, the size of the display screen 21 is large enough and not limited.

Figure 5:
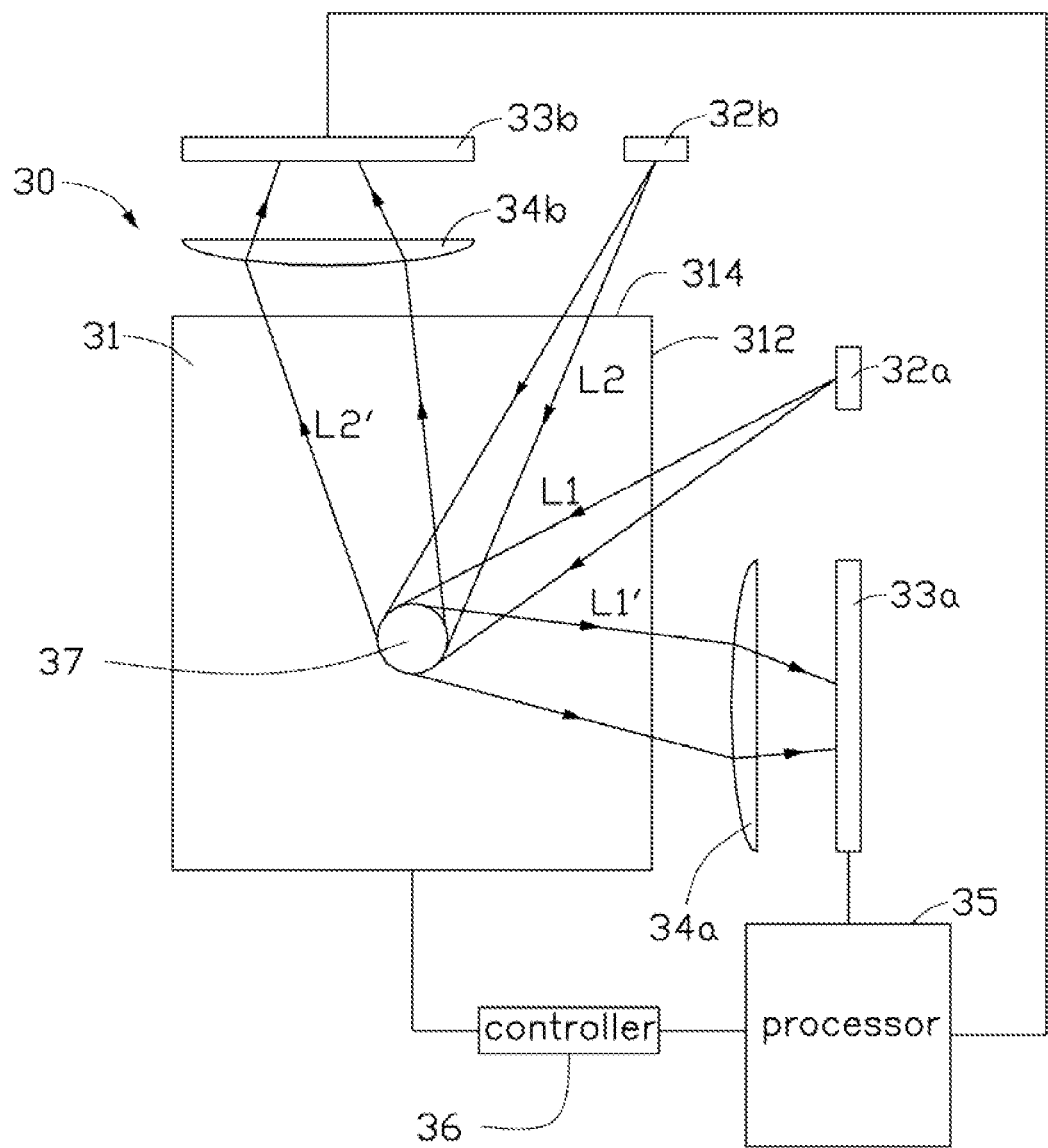
FIG. 5 is a schematic view of an optical touch system according to a third exemplary embodiment.

Referring to FIG. 5, an optical touch system 30, according to a third exemplary embodiment, is shown, differing from the optical touch system 20 of the second embodiment only in the positioning of the infrared light source 32a, the linear infrared sensor 33a, and the lens 34a are adjacent to the first sidewall 312 outside the display screen 31. The infrared light source 32b, the linear infrared sensor 33b, and the lens 34b are positioned adjacent to the second sidewall 314 outside the display screen 31. The processor 35 is electrically connected to the linear infrared sensors 33a, 33b. The controller 36 is electrically connected to the processor 35 and the display screen 31.

Advantages of the optical touch system 30 of the third exemplary embodiment are similar to those of the optical touch system 20 of the second exemplary embodiment.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. An optical touch system, comprising:
    a display screen comprising a contact surface;
    two infrared light sources each configured for emitting infrared light to cover the contact surface;
    two linear infrared sensors each having a sensing surface with a lengthwise direction thereof parallel to the contact surface, each linear infrared sensor configured for capturing an image of the contact surface with an infrared portion representing a touch area of a contact object, the image having an aspect ratio greater than that of the contact surface;
    a processor configured for determining the touch location of the contact object based on the aspect ratio of the image, the aspect ratio of the contact surface, the location of the infrared portion on the image, the area of the infrared portion on the image, and the area of the touch portion of the contact object on the contact surface; and
    a controller configured for executing an instruction according to the determined location of the contact object on the contact surface.

2. The optical touch system as claimed in claim 1, wherein the display screen is rectangular and comprises a first sidewall, a second sidewall, a third sidewall, and a fourth sidewall; the first sidewall, the second sidewall, the third sidewall, and the fourth sidewall connect to each other end to end in that order; one of the infrared light sources and one of the linear infrared sensors are positioned adjacent to the first sidewall outside the display screen, and the other one of the infrared light sources and the other one of the linear infrared sensors are positioned adjacent to the third sidewall outside the display screen.

3. The optical touch system as claimed in claim 2, further comprising two lenses, one of the lenses is positioned adjacent to the first sidewall outside the display screen and corresponds to one of the linear infrared sensors and one of the infrared light sources, and the other one of the lenses is positioned adjacent to the third sidewall outside the display screen and corresponds to the other one of the linear infrared sensors and the other one of the two infrared light sources.

4. The optical touch system as claimed in claim 3, wherein each of the linear infrared sensors is a charge coupled device and comprises linear arrays of CCD pixels.

5. The optical touch system as claimed in claim 3, wherein each of the linear infrared sensors is a complementary metal oxide semiconductor and comprises linear arrays of CMOS pixels.

6. The optical touch system as claimed in claim 3, wherein the controller is electrically connected to the processor and the display screen.

7. The optical touch system as claimed in claim 1, wherein the display screen is rectangular and comprises a first sidewall, a second sidewall, a third sidewall, and a fourth sidewall, the second sidewall, the third sidewall, and the fourth sidewall connect to each other end to end in that order; one of the infrared light sources and one of the linear infrared sensors are positioned adjacent to the first sidewall outside the display screen, and the other one of the infrared light sources and the other one of the linear infrared sensors are positioned adjacent to the second sidewall outside the display screen.

8. The optical touch system as claimed in claim 7, further comprising two lenses, one of the lenses is positioned adjacent to the first sidewall outside the display screen, and the other one of the lenses is positioned adjacent to the second sidewall outside the display screen.

9. The optical touch system as claimed in claim 8, wherein each of the linear infrared sensors is a charge coupled device and comprises linear arrays of CCD pixels.

10. The optical touch system as claimed in claim 8, wherein each of the linear infrared sensors is a complementary metal oxide semiconductor and comprises linear arrays of CMOS pixels.

11. The optical touch system as claimed in claim 8, wherein the controller is electrically connected to the processor and the display screen.

\* \* \* \* \*